3,531,492
MERCAPTOBENZOTHIAZOLE PROCESS WITH MERCURY OR RED PHOSPHOROUS CATALYST
Hanno Maria Merlin, Somerville, and James Salvatore Marchese, North Plainfield, N.J., assignors to American Cyanamid Company, Stamford, Conn., a corporation of Maine
No Drawing. Filed Oct. 10, 1967, Ser. No. 674,091
Int. Cl. C07d 91/48
U.S. Cl. 260—306                     4 Claims

ABSTRACT OF THE DISCLOSURE

This invention relates to a novel process for making 2-mercaptobenzothiazole. More particularly, this invention relates to a novel catalytic process for making 2-mercaptobenzothiazole by the reaction of aniline, carbon disulfide and sulfur in the presence of an effective amount of a catalyst comprising red phosphorous or mercury.

---

This invention relates to a novel process for making 2-mercaptobenzothiazole. More particularly, this invention relates to a novel catalytic process for making 2-mercaptobenzothiazole by the reaction of carbon disulfide, aniline and sulfur in the presence of an effective amount of a red phosphorous or metallic mercury catalyst.

Among the large number of thiazole derivatives which are manufactured and used extensively as vulcanization accelerators for both natural and synthetic rubber, 2-mercaptothiazole is of prime importance. Methods of preparing 2-mercaptobenzothiazole have been the subject of extensive investigation for many years. The most commonly used synthesis is one based on the reaction of aniline, carbon disulfide, and sulfur. According to this method the reactants are charged to a suitable pressure vessel, for example, an autoclave, and heated at elevated temperatures for moderately long periods of time, i.e., up to about eight hours. As the reaction proceeds hydrogen sulfide, produced as a by-product of the reaction, accumulates and results in a pressure build-up in the autoclave.

Useful yields of 2-mercaptobenzothiazole are produced in this manner, i.e., greater than 80%, based on the aniline consumed. While this is a commercially useful process, there are distinct disadvantages inherent in it which result in high cost of manufacture. Thus, one of the major disadvantages of the conventional process is that extensive amounts of by-product tars are produced. This not only reduces the yield of 2-mercaptobenzothiazole, but it also necessitates a costly recovery step to bring the product to a desirable level of purity.

An additional disadvantage of conventional processes is the long reaction time required to obtain good yield of 2-mercaptobenzothiazole. Any method, therefore, which would reduce the reaction time required would obviously be economically advantageous, resulting in higher production capacity.

Benzothiazole is a by-product in the manufacture of 2-mercaptobenzothiazole. This by-product is used as an intermediate in the manufacture of other products, such as o-aminothiophenol by a caustic fusion process. The latter is also an important intermediate. Until the present time, benzothiazole has not been produced in good yields in conventional processes. It would thus be an added advantage if the manufacture of 2-mercaptobenzothiazole yielded more benzothiazole and less of the tarry by-products.

It is an object of this invention to provide a new method of producing 2-mercaptobenzothiazole whereby good yields of high-purity product are obtained. Other objects will become apparent from the following description of the invention.

It has now been discovered that if the reaction of aniline, carbon disulfide and sulfur, is carried out in the presence of red phosphorous or mercury as described below, under the same conditions of reaction as used in the conventional process, the rate of reaction is increased by a factor of up to five times and increased yields of 2-mercaptobenzothiazole are obtained in less than one-fourth the time presently required.

An additional feature of the present invention is the discovery that when the reaction is catalyzed as described above, essentially no tars are produced and the yield of the by-product benzothiazole is increased by as much as 50% over the amount obtained by the conventional uncatalyzed reaction.

These results are surprising in that it was not previously possible to effectively catalyze the reaction. It is also surprising in view of the fact that certain compounds which might be expected to exhibit catalytic activity in this reaction are relatively in effective, as for example, ammonium sulfide, triphenyl phosphine, diphenylamine, and an ethylene tetrasulfide polymer.

The process of this invention provides a means of producing 2-mercaptobenzothiazole wherein an essentially complete conversion of aniline to product is achieved in considerably less time, in higher yields and with better product purity and lower tar formation than heretofore possible.

According to the process of the present invention, aniline, carbon disulfide, and sulfur are charged to an autoclave along with a catalyst consisting of red phosphorous or mercury. The reaction mixture is then heated under pressure at an elevated temperature for a specified period of time, vented to remove excess carbon disulfide and/or hydrogen sulfide, and the product recovered by conventional means.

The range of concentration of reactants used in carrying out the reaction according to the present invention may vary widely. Although it is stoichiometrically possible, and indeed practical, to use equivalent amounts of aniline, carbon disulfide, and sulfur in conducting the reaction it has been found to be advantageous to utilize about 0.5 to 2.0 moles, or preferably about 0.8 to 1.4 moles each, of carbon disulfide and sulfur, for each mole of aniline.

The temperature used in carrying out the reaction is not especially critical, but will generally be in the range of from 180° C. to about 300° C., or preferably from 220° C. to 250° C.

The pressure which is achieved in the autoclave is due mainly to the vapor pressure of carbon disulfide and by-product hydrogen sulfide at the temperature of reaction. It is permissible, but not necessary, to additionally pressurize the autoclave with an inert gas, such as nitrogen, carbon dioxide, etc. The reaction pressure is not especially critical but will usually be in the range of from about 300 lbs./in.$^2$, preferably 800 to 15500 lbs./in.$^2$.

Ordinary red phosphorous or mercury may be used to catalyze the reaction in accordance with the invention. The concentration of red phosphorous or mercury used to catalyze the reaction should be controlled for best results. Based on the amount of aniline charged to the reactant mixture, desirable results of the present invention are achieved when the red phosphorous or mercury is used in a concentration of from 0.01 to about 5.0 mole percent. However, preferably from 0.5 to 1.5 mole percent of either catalyst is used.

2-mercaptobenzothiazole is a well known accelerator of vulcanization for both natural and synthetic rubber and as such as a very important commercial material. It has also found use in fungicidal and bacteriocidal applications.

EXAMPLE 1

Red phosphorous as a catalyst

A mixture of 4.66 parts of aniline (0.05 mole), 4.57 parts of carbon disulfide (0.06 mole), and 1.73 parts of sulfur (0.054 mole) was added to a mini-clave. To this was added 1 mole percent, based on the aniline, of red phosphorous. The reaction mixture was heated to 240° C. Samples were withdrawn at the indicated time intervals with the following results:

| Time, hours | Aniline converted to MBT, percent |
|---|---|
| 1.5 | 71.0 |
| 3.0 | 88.8 |
| 4.5 | 88.3 |

In this example 6.3% of benzothiazole was obtained after 4.5 hours.

EXAMPLE 2

Metallic mercury as a catalyst

The procedure of Example 1 was followed except that the catalyst consisted of 0.1 g. of metallic mercury. After 3 hours at 240° C., 88.07% of the aniline was converted to MBT. In this example 6.34% of benzothiazole was obtained after 3 hours.

We claim:

1. In a process for the manufacture of 2-mercaptobenzothiazole wherein aniline, carbon disulfide and sulfur are heated at an effective temperature under pressure in an autoclave, and wherein the mole ratio of carbon disulfide and sulfur to aniline is about 0.5 to 2.0 moles of each per mole of aniline, the improvement which comprises carrying out the reaction in the presence of metallic mercury of red phosphorous in an amount of from 0.01 to about 5.0 mole percent based on aniline.

2. A process according to claim 1 wherein the reaction is conducted at a temperature of from 180 to 300° C.

3. The process of claim 1 wherein the catalyst is red phosphorous.

4. The process of claim 1 wherein the catalyst is mercury.

References Cited

UNITED STATES PATENTS

| | | | |
|---|---|---|---|
| 1,631,871 | 6/1927 | Kelly | 260—306 |
| 2,631,153 | 3/1953 | Paul et al. | 260—306 |

ALEX MAZEL, Primary Examiner

R. J. GALLAGHER, Assistant Examiner

UNITED STATES PATENT OFFICE
CERTIFICATE OF CORRECTION

Patent No. 3,531,492          Dated September 29, 1970

Inventor(s) Hanno Maria Merlin, James Salvatore Marchese

It is certified that error appears in the above-identified patent and that said Letters Patent are hereby corrected as shown below:

Column 2, line 57, "15500" should read --1500-- as appears on page 4, line 3 of the original specification.

SIGNED AND
SEALED
DEC 1 - 1970

(SEAL)
Attest:

Edward M. Fletcher, Jr.
Attesting Officer

WILLIAM E. SCHUYLER, JR.
Commissioner of Patents